United States Patent
Burrows et al.

(10) Patent No.: US 6,936,335 B2
(45) Date of Patent: Aug. 30, 2005

(54) ADDRESSABLE PTF RECEPTOR FOR IRADIATED IMAGES

(75) Inventors: Kenneth Burrows, Phoenix, AZ (US); Klaus C. Wiemer, Dallas, TX (US)

(73) Assignee: OryonTechnologies, LLC, Addison, TX (US)

( * ) Notice: Subject to any disclaimer, the term of this patent is extended or adjusted under 35 U.S.C. 154(b) by 255 days.

(21) Appl. No.: 10/450,708

(22) PCT Filed: Dec. 21, 2001

(86) PCT No.: PCT/US01/50573

§ 371 (c)(1),
(2), (4) Date: Jun. 24, 2003

(87) PCT Pub. No.: WO02/052484

PCT Pub. Date: Jul. 4, 2002

(65) Prior Publication Data

US 2004/0067393 A1 Apr. 8, 2004

Related U.S. Application Data

(60) Provisional application No. 60/258,566, filed on Dec. 27, 2000.

(51) Int. Cl.[7] .............................................. B32B 3/00
(52) U.S. Cl. .................................... 428/205; 428/195.1
(58) Field of Search ............................. 428/195.1, 205; 328/124

(56) References Cited

U.S. PATENT DOCUMENTS

| | | | | |
|---|---|---|---|---|
| 4,394,773 A | * | 7/1983 | Ruell | 382/124 |
| 5,815,598 A | * | 9/1998 | Hara et al. | 382/211 |
| 5,856,029 A | | 1/1999 | Burrows | |
| 5,856,030 A | | 1/1999 | Burrows | |
| 6,091,838 A | | 7/2000 | Burrows et al. | |
| 6,205,690 B1 | | 3/2001 | Heropoulos et al. | |
| 6,411,726 B1 | * | 6/2002 | Pires | 382/124 |

OTHER PUBLICATIONS

R. Peruzzi and M. D'Ovidio, "Realization of a Wholly Screen Printed Silicon Solar Cell Production Line," 12th European Photovoltaic Solar Energy Conference, (Apr., 1994).

M. Hammonds, "Harnessing the Power of Light," Vacuum and Thin Film, p. 20–25, (Feb., 1999).

Robert H. Detig, Ph.D., "Electrostatic Printing of Functional Materials, a Versatile Manufacturing Process for Flat Panel Displays," delivered to K. Burrows, (Mar. 15, 1999).

* cited by examiner

Primary Examiner—Rena Dye
Assistant Examiner—Timothy M. Speer
(74) Attorney, Agent, or Firm—Locke Liddell & Sapp LLP

(57) ABSTRACT

An addressable receptor in laminate form, and advantageously in PTF laminate form, comprising a front conductive layer including a plurality of substantially parallel front electrode strips and a rear conductive layer also including a plurality of substantially parallel rear electrode strips. The conductive layers are orientated with respect to each other so that an array of electrode regions of intersection is formed corresponding to the regions at which the front electrode strips cross over the rear electrode strips. The first and second conductive layers are separated by a reactive layer comprising a plurality of defined reactive regions. The reactive regions are deployed in a reactive array substantially in register with the array of electrode regions of intersection, so that the reactive regions are electrically addressable by coordinate pairs of first and second electrode strips. The front electrode strips are partially transparent to radiation in a selected waveband. In operation, an irradiated image in the selected waveband is directed onto the receptor laminate. The irradiated pattern passes through the transparent front electrode strips and selectively energizes the addressable reactive regions in a corresponding pattern.

25 Claims, 4 Drawing Sheets

ADDRESSABLE PTF RECEPTOR FOR IRADIATED IMAGES

RELATED APPLICATIONS

This application claims benefit of U.S. provisional application 60/258,566, filed Dec. 27, 2000.

Reference is hereby made to the following two commonly assigned U.S. Patents: (1) ELECTROLUMINESCENT SYSTEM IN MONOLITHIC STRUCTURE, U.S. Pat. No. 5,856,029, issued Jan. 5, 1999, and (2) ELASTOMERIC ELECTROLUMINESCENT LAMP, U.S. Pat. No. 5,856,030, issued Jan. 5, 1999, the disclosure of which patents are both incorporated herein by reference.

Reference is further made to commonly-assigned co-pending U.S. Patent Applications (1) IRRADIATED IMAGES DESCRIBED BY ELECTRICAL CONTACT IN THREE DIMENSIONS, Ser. No. 09/213,692, filed Dec. 17, 1998, (2) MEMBRANOUS MONOLITHIC EL STRUCTURE WITH URETHANE CARRIER, Ser. No. 60/239,507, filed Oct. 11, 2000, and (3) MEMBRANOUS EL SYSTEM IN UV-CURED URETHANE ENVELOPE, Ser. No. 60/239,508, filed Oct. 11, 2000, disclosures of which applications are also incorporated herein by reference.

TECHNICAL FIELD OF THE INVENTION

This invention relates generally to the interpretation and conversion of irradiated images into electrical signals, and more specifically to an addressable Polymer Thick Film ("PTF") device that enables such interpretation and conversion.

BACKGROUND OF THE INVENTION

Devices are known in the art to capture images described by contact on a surface. A primary, although by no means exclusive, application for such imaging devices is in the area of fingerprinting, whether for security, forensics or other purposes. Other applications include analysis of surface texture for classification or testing purposes, or recording contact for archival purposes, or possibly mechanical duplication.

All of the foregoing applications involve translating the image described by contact into a reproducible record of the image. For example, in the fingerprint application, a time-honored system is to "ink" the fingers and roll them on a paper or card surface. Of course, without further scanning of the results, such systems lack the capability to generate computer-ready signals representative of the images. Without the storage and analysis capabilities of a computer, cataloging and comparison of such fingerprint images is a time-consuming and unpredictable task.

More recent devices shine light onto the fingerprint via a prism. The reflected image may be captured on photosensitive film, or received onto a photosensitive array. In the latter case, the image may then be pixelated and stored as an analog or digital signal representative of the image. These signals are now available for further processing by computers.

The specification of co-pending, commonly assigned U.S. patent application IRRADIATED IMAGES DESCRIBED BY ELECTRICAL CONTACT IN THREE DIMENSIONS incorporated herein by reference (hereafter "Irradiated Images"), discloses an invention that generates images described by contact, in which the contact itself closes an open circuit to generate radiation in a pattern in register with the contact. In this way, an irradiated image results, which corresponds directly to the contact pattern energizing the radiation.

A preferred embodiment of Irradiated Images is enabled by a Polymer Thick Film ("PTF") electroluminescent system without a rear electrode, in which a fingerprint is disposed to close the open circuit by making contact and thereby serving as a "temporary" rear electrode. The electroluminescent system then energizes in a pattern in register with the contact (i.e. the fingerprint) to emit a high-resolution image of visible light with high fidelity to the contact. This image may then be directed on to a photosensitive array suitable for conversion into an electrical signal representative of the image.

Irradiated Images emphasizes that it is in no way limited to fingerprinting applications. According to the invention, any form of electrically conductive contact will describe an irradiated image. Thus, the surface textures of many objects, animate or inanimate, may be imaged with the invention.

Further, Irradiated Images teaches that it is not limited to contact generating visible light via a PTF electroluminescent system. Although the preferred PTF embodiment is highly advantageous, Irradiated Images contemplates generation by contact of any radiation in the electromagnetic spectrum to enable the invention. Such contact-generated radiation may or may not be energized using an electroluminescent system, PTF or otherwise. For example, an infra-red image could be generated by an open circuit where heat is emitted in a pattern in register with selective closure of the circuit by the contact. Clearly, yet further fidelity and resolution of images described by contact may be available through selection of the wavelength of the radiation generated by the invention, as may be compatible with the device receiving and interpreting the irradiated image.

Moreover, Irradiated Images is not limited to imaging to two dimensions. Particularly when deployed using elastomeric electroluminescent lamp techniques such as disclosed in commonly-assigned U.S. Patents ELASTOMERIC ELECTROLUMINESCENT LAMP (hereafter "Elastomeric Lamps") and ELECTROLUMINESCENT SYSTEM IN MONOLITHIC STRUCTURE, (hereafter "EL Monolithic Structure"), the disclosures of which applications are fully incorporated by reference herein, Irradiated Images allows true three-dimensional images to be taken of three-dimensional surfaces. The membranous properties of elastomeric lamp layers such as disclosed in the above-referenced patents facilitate deploying Irradiated Images on such a three-dimensional surface. So deployed, a three-dimensional image can be energized that is in register with corresponding three dimensional contact. This image may then be converted to an electrical signal that is representative of the three-dimensional contact without approximation or projection from a planar or two-dimensional state.

The foregoing exemplary image-generation mechanisms all require a receptor device for images to be memorialized for later processing. The processing power of computers becomes enabled when such receptors generate digital representations of the images. It would therefore be highly advantageous to provide a two- or three-dimensional addressable receptor in laminate form capable of generating such digital representation of images. It would be further advantageous to provide such an addressable receptor whose design lent itself to construction in PTF form. Such an addressable PTF receptor would be reliable and inexpensive to manufacture, especially if made in accordance with techniques such as are disclosed in co-pending, commonly-owned U.S. patent applications MEMBRANOUS MONOLITHIC EL STRUCTURE WITH URETHANE CARRIER (hereafter "Urethane Carriers") and MEMBRANOUS EL SYSTEM IN UV-CURED URETHANE ENVELOPE (hereafter "UV-curable EL"), the disclosures of which applications are incorporated herein by reference. Moreover, such an addressable PTF receptor would be highly compatible with the image-generating devices such as taught by Irradiated Images in both two- and three-dimensional deployments.

SUMMARY OF THE INVENTION

These and other objects, features and technical advantages are achieved by an addressable receptor in laminate form that generates electrical signals responsive to irradiated images. A preferred embodiment is deployed advantageously in membranous PTF laminate form using urethane content and UV-curable inks, although the invention is not limited in any of these regards. A preferred embodiment also generates electrical signals readable by a digital processor, although again the invention is not limited in such regard.

The inventive laminate substantially comprises a rear conductive layer including a plurality of substantially parallel rear electrode strips, each of which is substantially electrically isolated, and an at least partially translucent front conductive layer also including a plurality of substantially parallel front electrode strips, each of which is also substantially electrically isolated. The front conductive layer is displaced angularly with respect to the rear conductive layer so that an array of electrode regions of intersection is formed corresponding to the regions at which the rear electrode strips cross over the front electrode strips.

It will be noted that in the preferred embodiment described herein, the rear and front electrode strips are disclosed substantially straight and substantially perpendicular to each other for ease of illustration and description. It will nonetheless be understood that the invention is not limited in this regard. Consistent with the scope of the invention, the rear and front electrode strips may each follow any desired curved or contoured pattern, in two or three dimensions, so long as the strips run substantially parallel within the pattern, and so long as when superposed, the rear and front electrode strips intersect to form a definable array of electrode regions of intersection.

The rear and front conductive layers in the inventive laminate are separated by a reactive layer. By "reactive," it will be understood that portions of the layer generate electrical impulses, or undergo resistive change, when exposed to radiation in the electromagnetic spectrum. While a preferred embodiment of the invention contemplates a photosensitive layer that is reactive to visible light, it will be understood that the invention is not limited just to photosensitive performance, and other types of reactive layer that may be also responsive to radiation outside the visible spectrum are within the scope of the invention.

Alternative deployments of the reactive layer are disclosed. In a first deployment, the reactive layer comprises a plurality of discrete and substantially electrically isolated reactive regions. Non-conductive filler, such as a dielectric, surrounds the reactive regions to isolate them. The reactive regions are deployed in a reactive array substantially in register with the array of electrode regions of intersection. The reactive regions thus become electrically addressable by coordinate pairs of rear and front electrode strips. In a second embodiment, the reactive layer comprises a unitary layer of substantially uninterrupted reactive material commonly separating rear and front electrode strips at multiple, and in many cases, all of the electrode regions of intersection. The reactive material in the unitary layer in this second embodiment also advantageously possesses "Z-axis" properties, meaning that its structural properties allow electrical pathways only in a direction through the "thickness of the laminate," i.e orthogonal to the plane of the laminate. The electrode regions of intersection in this second embodiment thus define "zones" in the unitary reactive layer that are addressable by the respective coordinate pairs of rear and front electrodes. The size of the zones tends to correspond substantially to the size of the intersecting area of electrode strips, especially if the reactive material possesses strong "Z-axis" properties. The width of the intersecting electrode strips and their angle of intersection thus influence the size of the addressable reactive zones.

Non-conductive filler material is interposed between the front electrode strips to ensure substantial electrical isolation. Other advantages of interposing non-conductive filler between the front electrode strips are described below. Non-conductive filler is also advantageously interposed between rear electrode strips, although design criteria may arise when such filler may be omitted. Non-conductive filler materials are well known. In the preferred embodiment, an exemplary suitable non-conductive filler material is a dielectric such as barium-titanate or titanium-dioxide. The non-conductive filler material may advantageously be deployed using a urethane carrier, and further advantageously using a UV-curable urethane carrier, bringing additional advantages such are disclosed in Urethane Carriers and UV-curable EL.

As noted, the preferred embodiment of the invention is responsive to irradiated images of visible light, although the invention is not limited in this regard. Accordingly, the front electrode strips comprise an electrode material that is translucent at least to visible light, such as indium-tin-oxide. The rear electrode strips may be made from well-known conductive materials that are opaque to light, such as, for example, silver, graphite or copper. Silver is particularly advantageous in the rear electrode strips because of its reflective properties. In embodiments where the inventive receptor is responsive to other wavelengths of radiation outside the visible spectrum, it will be understood that the front electrode strips in such embodiments will comprise a material that is at least partially translucent to such radiation.

The reactive regions comprise an active ingredient selected to generate electric potential or resistive change when exposed to radiation in a specific wavelength range. In the preferred embodiment responsive to irradiated images of visible light, exemplary active ingredients include multi-crystal silicon, cadmium-telluride (n-type) or cadmium-sulfide (p-type) in a p-n junction format, although it will be appreciated that many reactive materials are known and available as alternative active ingredients responsive to radiation above, below and including the visible spectrum. Alternatively, use of silver-sulfide in the p-n junction in the reactive layer will bring about resistive change upon exposure to radiation.

It is therefore a technical advantage of the present invention to generate a digital signal representative of an irradiated image. In operation, an irradiated image is directed onto the receptor laminate. In the preferred embodiment responsive to visible light, the irradiated pattern passes through the translucent front electrode strips and selectively energizes the reactive layer in a corresponding pattern. Where energized, the reactive regions or zones generate electric potential (or alternatively resistive change) across the coordinate pairs of electrode strips addressed thereby. The condition of all of the reactive regions or zones (i.e. the reactive array) is periodically sampled by polling a series of predetermined sequences of coordinate pairs of electrode strips. The polled value of the electrical potential across specific coordinate pairs in the series of sequences defines the current energized (or resistive) state of the reactive array, and thus may be used to generate a corresponding digital signal representative of the condition of the reactive array. Such a digital signal may thus be captured as a computer-readable representation of the irradiated image directed onto the reactive receptor. Here again, two alternative embodiments are disclosed. In one embodiment, the polling merely detects the existence of electrical potential (or resistive change) at coordinate pairs of electrode strips. Such information may be used to generate a digital signal corresponding to a two-tone representation of the irradiated image. In a second embodiment, the polling further measures the value of electrical potential (or resistive change) at coordinate pairs of electrode strips. Such additional data may be used to enrich the corresponding digital signal with gray-scale information.

Another technical advantage of the present invention is that it is immediately compatible with image-generating laminates such as are taught by Irradiated Images. In fact, the reactive receptor laminate of the present invention may be combined with an image-generating laminate such as in Irradiated Images to form a combined unitary laminate assembly. Moreover, EL manufacturing techniques such as are taught in EL Monolithic Structure will further enable two or more neighboring layers across the combined unitary laminate assembly to achieve substantially monolithic properties.

This combined generator/receptor assembly will be immediately seen to have added advantages in that it is a self-contained laminate capable of generating a digital signals representative of a pattern of contact.

A further advantage of the present invention is that, when desired, the reactive receptor laminate may be fabricated in accordance with techniques disclosed in Elastomeric Lamps, Urethane Carriers and UV-curable EL so as to achieve membranous properties in rapid-cure form. Such receptor laminates will then be immediately compatible with sources of irradiated images contoured into three dimensions, such as are disclosed in Irradiated Images.

A still further technical advantage of the present invention is that it is scalable. Alternative techniques available to be used in construction of the receptor laminate may be selected according to the reactive array resolution desired. Embodiments described herein teach a number of exemplary combinations of construction techniques designed to achieve varying levels of reactive array resolution.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE INVENTION

As described summarily above, the present invention comprises an apparatus disposed to receive irradiated images and generate electrical signals which correspond to the received image. Advantageously, the signals are computer-readable. A preferred embodiment includes a membranous PTF laminate comprising urethane and UV-curable inks. The preferred embodiment further includes an array of regions addressed by conductive material, with reactive material located at the addressable regions of the array. When selectively activated or stimulated, the addressable reactive material is disposed to generate signals, advantageously computer-readable, representative of an irradiated image causing such selective activation or stimulation.

Figure 1:
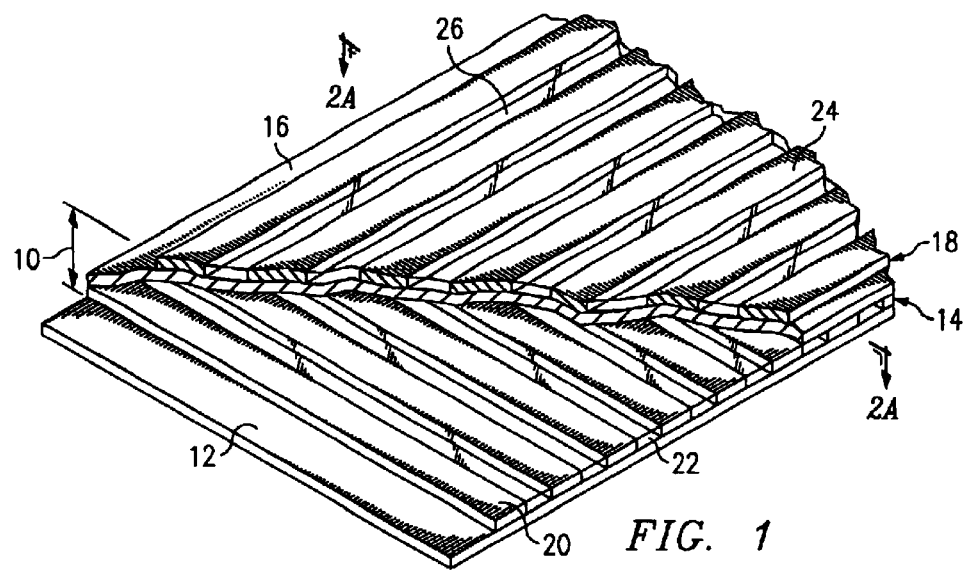
FIG. 1 is a cutaway view of one embodiment of the present invention.

Turning now to FIG. 1, a general arrangement of a first embodiment is illustrated. Laminate 10 includes a plurality of layers, including a translucent substrate layer 12, a front translucent electrode layer 14, a reactive layer 16, and a rear electrode layer 18. In the embodiment of FIG. 1, the layers are advantageously deployed in Polymer Thick Film, or PTF, form.

With further reference to FIG. 1, laminate 10 comprises a substrate layer 12 on which front translucent electrode layer 14 is deployed. In a preferred embodiment, substrate layer 12 may be any suitable material allowing the passage of visible light, such as polyester, polycarbonate, vinyl or elastomer. In embodiments where the inventive receptor is responsive to other wavelengths or radiation outside the visible spectrum, it will be understood that the substrate layer 12 in such embodiments will comprise a material that is at least partially translucent to such radiation.

With respect to the front translucent electrode layer 14, the layer 14 itself includes translucent electrode strips 20 and front insulator strips 22. The electrode strips 20 and the insulator strips 22 are positioned such that each electrode strip 20 is electrically isolated. Inks doped with a translucent conductive material and inks doped with an insulator such as a dielectric material may be deployed, for example using screen printing, to form the electrode strips 20 and insulator strips 22 included in front translucent electrode layer 14. In the embodiment of FIG. 1, the electrode strips 20 and the insulator strips 22 are arranged in a substantially straight, parallel alignment; however, it will be appreciated that the invention is not limited in this regard, and that other alignments are available, such as wavy, curved, spherical or other alignments.

As noted, the translucent electrode strips 20 may be comprised of conductive ink and, in one embodiment, are deployed by screen printing. Other methods of deploying the translucent electrode strips 20 may include micro pen deposition, photo mask etching, electrostatic printing, rotary gravure, and hollow fibre deposition. The translucent electrode strips 20 may be in the range of five to seven microns thick and are advantageously positioned on spacings of up to 50 microns, although the invention is not limited in this regard if coarser or finer resolution is advantageous to the particular service. In order to resolve optimal detail in a human fingerprint, the translucent electrode strips 20 should be advantageously spaced less than 20 microns apart. Current CCD camera receptors generally resolve down to 9 microns. Accordingly, a reactive receptor according to the present invention in CCD service should provide translucent electrode strips 20 spaced about 9 microns apart.

In a preferred embodiment, the invention is responsive to irradiated images of visible light, thus the front translucent electrode layer 14 may comprise a translucent conductive material that is translucent to visible light, such as indium-tin-oxide. Other suitable translucent conductive materials may act as the electrode material in the front translucent electrode layer 14, such as aluminum-tin-oxide or tantalum-tin-oxide, zinc-coated glass fibre, fine gold, or doped antimony. In embodiments where the inventive receptor is responsive to other wavelengths or radiation outside the visible spectrum, it will be understood that the front electrode strips 20 in such embodiments will comprise a material that is at least partially translucent to such radiation. Insulator strips 22, aligned between front translucent electrode strips 20, may comprise barium titanate, titanium dioxide or other suitable materials.

FIG. 1 also illustrates reactive layer 16 deployed adjacent to front translucent layer 14. It will be understood that a pattern of radiation, such as light, directed onto the reactive layer 16 will activate the reactive layer 16 in the areas of the layer actually exposed to radiation. Referring momentarily to FIG. 4B, addressable zones 38 in the exposed areas of the reactive layer 16 will become activated and will generate detectable changes in state (e.g. resistance) that may be polled. It will be then appreciated that such polled changes in state may be advantageously represented as computer readable signals corresponding to the activated areas of the reactive layer 16.

In a preferred embodiment, reactive layer 16 is approximately 10–15 microns thick and is comprised of a vinyl or urethane carrier doped with a multi-crystal silicon, or with cadmium-telluride (n-type), or with cadmium-sulfide (p-type). P-n junctions are created within the reactive layer 16 which, when exposed to radiation, will generate an electrical charge. Alternatively, the reactive layer 16 may be doped with silver-sulfide which, when exposed to radiation, will exhibit a measurable resistive change. Materials such as cadmium-telluride and silver-sulfide are commonly available in the industry but can also be purchased from the Aldrich Company in 5 micron powder form.

Figure 4A:
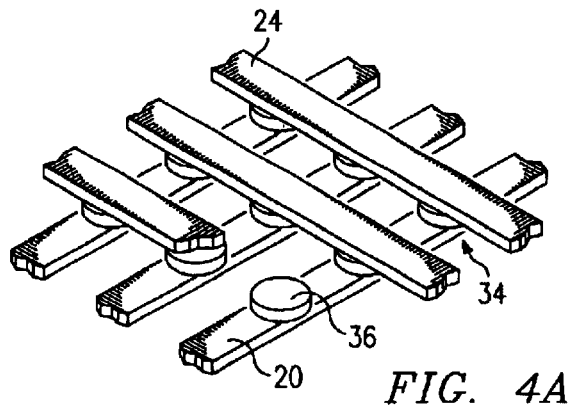
FIG. 4A is a cutaway view of one embodiment of the present invention.
Figure 4B:
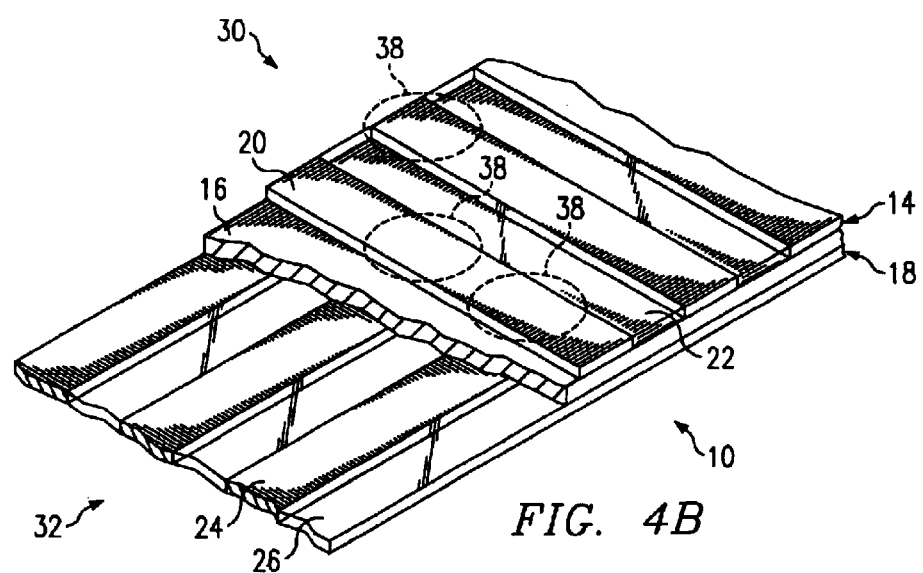
FIG. 4B is a cutaway view of an alternative embodiment of the present invention.

Referring briefly to FIGS. 4A and 4B, the reactive layer 16 may comprise a continuous layer over the front translucent electrode layer 14 as shown in FIG. 4B. Common screen-printing, ink-jet printing, electrostatic deposition, rotary gravure, or rotary flexo techniques may be used to apply this layer of reactive material. Alternatively, as depicted in FIG. 4A, the reactive layer 16 may comprise a plurality of discontinuous "regions" 36 of reactive material deployed at each region of intersection 34 where the translucent electrode strips 20 intersect the rear electrode strips 24.

With further reference to FIG. 1, a preferred embodiment includes the rear electrode layer 18 deployed adjacent to the reactive layer 16. Analogous to front translucent electrode layer 14, the rear electrode layer 18 comprises non-intersecting, alternating electrode strips 24 and insulator strips 26. Electrode strips 24 may be deployed by screen-printing techniques, or other methods such as micro pen deposition, photo mask etching, electrostatic printing, rotary gravure, or hollow fibre deposition, and may range from 1–50 microns wide and 8–10 microns thick. The deployed thicknesses of insulator strips 26 and electrode strips 24 are advantageously substantially the same. This assists in deployment of a rear electrode layer 18 that is substantially uniform in thickness.

Figure 3A:
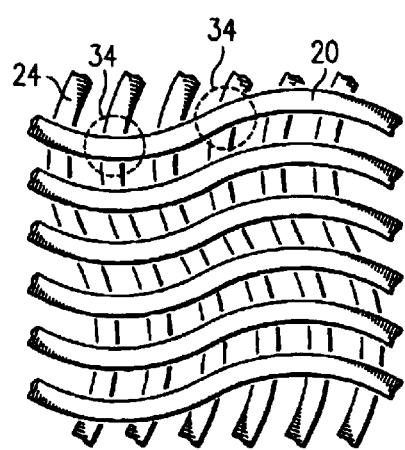
FIGS. 3A and 3B are plan views of two alternative embodiments of the present invention depicting different electrode array patterns.
Figure 3B:
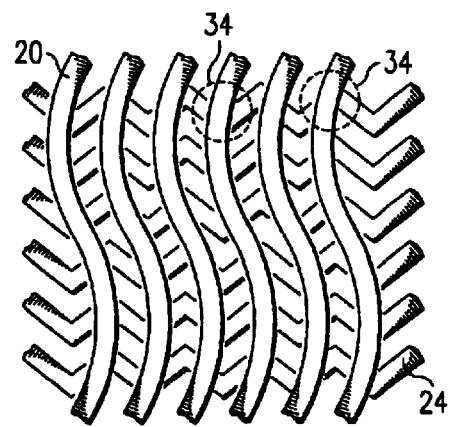

Referring briefly to FIGS. 3A and 3B, the rear electrode layer 18 and the front translucent electrode layer 14 are oriented relative to each other such that the translucent electrode strips 20 and the rear electrode strips 24 create array of regions of intersection 34 separated by the addressable zones 38 of reactive layer 16 shown in more detail on FIG. 4B. Although illustrated on FIGS. 4A and 4B to be orthogonal, it will be understood that the invention is not limited in this regard. It will be appreciated that, consistent with the invention, the front translucent electrode layer 14 and the rear electrode layer 18 may be oriented relative to each other in any orientation so long as an addressable array is formed by their regions of intersection 34. It will be appreciated further that front translucent electrode strips 20 and rear electrode strips 24 may be of different widths and thicknesses and may feature different patterns or different arrangements of electrode strips, as illustrated in exemplary fashion on FIGS. 3A and 3B, in defining an addressable array of regions of intersection 34.

The non-translucent rear electrode strips 24 of rear electrode layer 18 may comprise any suitable, conductive material, such as, for example, silver, graphite, copper (photo-etched or in native form), metal oxide, or spherical glass in sub-micron form coated with metal to form a conductive powder. With respect to the rear insulator strips 26, in a preferred embodiment, the insulator strips 26 comprise barium titinate.

The layers 14, 16, and 18 of the inventive laminate 10 may be deployed using technology taught in Irradiated Images, EL Monolithic Structure, Elastomeric Lamps, Urethane Carriers and UV-curable EL, all of which disclosures are incorporated herein by reference. The laminate 10 may be assembled in the order as discussed above (e.g., the front electrode layer 14, deployed before the reactive layer which are deployed before the rear electrode layer 18), or reverse order of deployment may be equally advantageous. A sealing layer 28 may be added to protect the laminate and to seal it electrically.

In a preferred embodiment, all layers in laminate 10 are advantageously screen printed, including the front translucent electrode layer 14, the reactive layer 16, and the rear electrode layer 18. In an alternative embodiment disclosed in FIG. 4A and discussed below. However, discontinuous reactive regions 36 may preferably be ink-jet printed.

In other embodiments, the rear electrode strips 24 and the front translucent electrode strips 20 may also be photo-mask etched on sputtered polyester or some other suitable substrate. Some of the UV-curable, monolithic and membranous advantages of screen-printing in accordance with Irradiated Images, EL Monolithic Structure, Elastomeric Lamps, Urethane Carriers and UV-curable EL may be adversely affected with etching, but photo-mask etching is known to achieve line widths down to 6 microns if such resolution is needed. A membranous structure using a unitary carrier is also a highly advantageous embodiment of the invention, particularly in the 3-dimensional embodiment depicted in FIG. 5B, but it will be understood that the invention is not limited to this embodiment, or indeed to any of the foregoing embodiments described above.

Figure 2A:
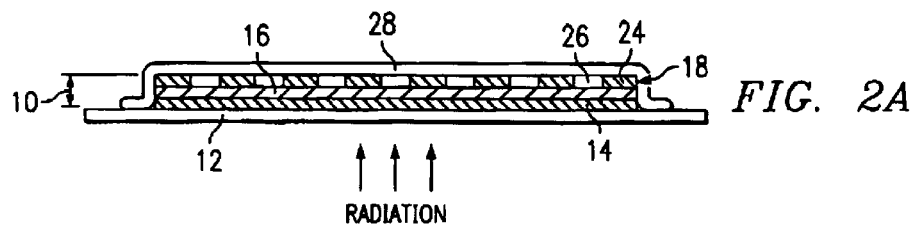
FIG. 2A is section view as shown on FIG. 1.

Turning now to FIG. 2A, a cross section as shown on FIG. 1 is shown. It will be seen on FIG. 2A that laminate 10 also may include a sealing layer 28 on top of the rear electrode layer. This sealing layer 28 is omitted from FIG. 1 for clarity. The sealing layer 28 may comprise vinyl or urethane or any other suitable material translucent to the irradiated image being sensed. Sealing layer 28 is optional depending on the application in which the laminate 10 is used.

Figure 2B:
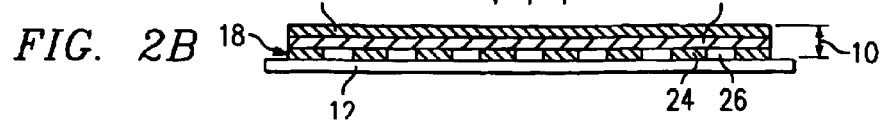
FIG. 2B is a section view through an alternative embodiment of the present invention.

FIG. 2B is a similar cross-section to FIG. 2A, illustrating an alternative embodiment of the invention. In this embodiment, the rear electrode layer 18 is positioned adjacent to the substrate layer 12. In this arrangement, the substrate layer 12 need not be translucent to the radiation to which the laminate 10 is exposed. In fact, an alternative embodiment of the disclosed invention features a reflective substrate layer 12 such that the irradiated image to which the laminate 10 is exposed may reflect back through the laminate 10 and further energize reactive layer 16 in selected addressable regions.

Figure 2C:
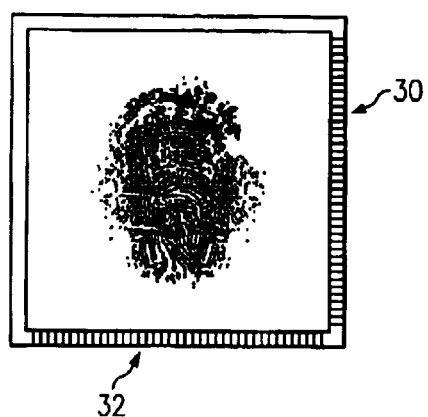
FIGS. 2C and 2D depict the invention in operation.
Figure 2D:
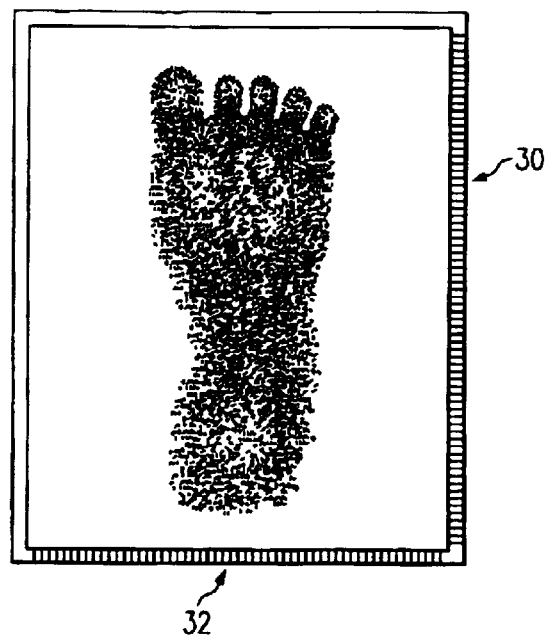

FIGS. 2C and 2D show exemplary irradiated images, specifically a thumb print and a footprint, being received by an addressable receptor as disclosed herein. FIG. 2C shows one embodiment of the disclosed invention where y-contacts 30 are connected to the rear electrode layer 18 (not shown) thereby providing the y-coordinates identifying the addressable zones 38 of the reactive layer 16 (not shown) selectively activated by the irradiated image. Similarly, x-contacts 32 are connected to the front translucent electrode layer 14 (not shown) thereby providing the x-coordinates corresponding to the addressable zones 38 of the reactive layer 16 selectively activated by the irradiated image. In another embodiment shown in FIG. 2D, the y-contacts 30 are connected to the front translucent electrode layer 14 and provide the y-coordinates for activated addressable zones 38 of the reactive layer 16. Similarly, the x-contacts 32 are connected to the rear electrode layer 18 and provide the x-coordinates for the activated addressable zones 38 of the reactive layer 16.

FIGS. 3A and 3B show plan views of two alternative embodiments in which front translucent electrode strips 20 and rear electrode strips 24 intersect to form irregularly-shaped arrays of electrode regions of intersection 34.

Figure 3C:
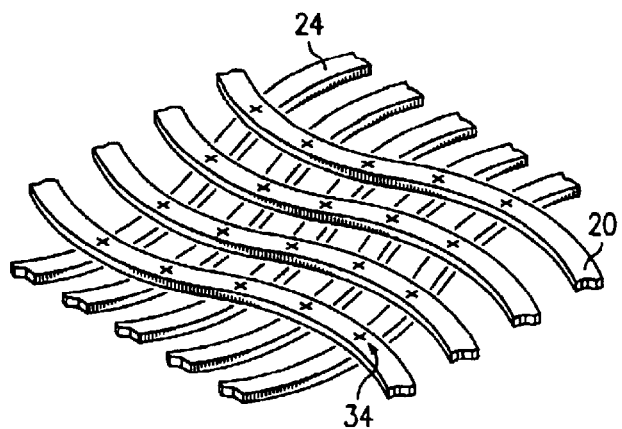
FIG. 3C is an orthographic view of a three-dimensional embodiment of the present invention.

FIG. 3C is an orthographic view of an alternative embodiment in which rear electrode strips 24 and front translucent electrode strips 20 intersect to form a three-dimensional array of regions of intersection 34.

As discussed above, FIG. 4A shows an alternative embodiment comprising reactive regions 36 included in reactive layer 16. In this embodiment, the reactive layer 16 is discontinuous and is comprised of reactive regions 36 deployed at the regions of intersection 34 between the front translucent electrode strips 20 and the rear electrode strips 24. Note that although reactive regions 36 are depicted on FIG. 4A as circular, it will be understood that reactive regions 36 may be any suitable shape. Reactive regions 36 are surrounded by insulator material (not shown), such as barium titanate or other dielectric material. In a PTF embodiment, the reactive layer 16 comprising reactive regions 36 may advantageously be deployed at thicknesses ranging from 5–7 microns, although the invention is not limited in this regard.

The reactive regions 36 illustrated in FIG. 4A may be preferably deployed using ink-jet printing techniques commonly known in the art; however, any method of deploying the regions 36 may be used. Preferably, a urethane carrier may be included in the ink comprising reactive regions 36 in the embodiment of FIG. 4A; however, the invention is again not limited in this regard. By using ink-jet technology, the reactive regions 36 may be deployed as dots with diameters of 5–15 microns; however, it will be appreciated that reactive regions 36 may be deployed in any suitable size Additional embodiments of the invention may use alternative techniques in deploying the reactive regions 36; such as, micro-pen or hollow fiber deposition. Hollow fiber deposition is known to inject material for deposition through a hollow fiber and then permit laser curing in situ.

When reactive layer 16 is in discontinuous region form, such as illustrated in FIG. 4A, the reactive regions 36 are advantageously deployed first. The next step may be to print around the reactive regions 36 with a dielectric insulator material (not shown). Such selective printing techniques are well known in the screen printing art.

FIG. 4B illustrates an alternative embodiment with reactive layer 16 in continuous layer form and of a sufficient thickness that the laminate 10 is able to provide "z-axis" conductivity properties as described above in the "Summary" section of this disclosure. Also shown in FIG. 4B are addressable zones 38 of reactive layer 16. These addressable zones 38 correspond to areas where the front translucent electrode strips 20 and rear electrode strips 24 intersect to form regions of intersection 34 as illustrated on FIGS. 3A, 3B and 3C. When the reactive layer 16 is activated at one of these addressable zones 38, a signal may be detected at the corresponding region of intersection 34 of electrode strips 20 and 24. When an irradiated image is exposed to the laminate 10, a selected addressable zones 38 corresponding to the irradiated image will be activated, as depicted in exemplary fashion in FIGS. 2C and 2D discussed above.

Figure 5A:
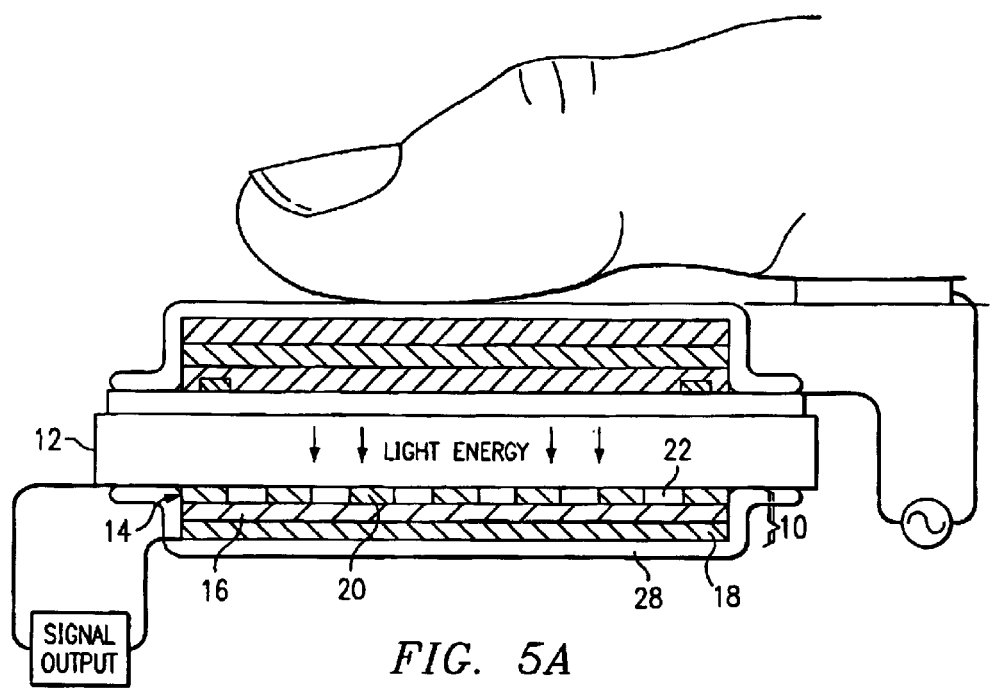
FIG. 5A is a section view of a two-dimensional embodiment of the present invention in use.

FIG. 5A is an elevation view of an image generator as disclosed in Irradiated Images combined with a receptor laminate 10 as disclosed herein in two-dimensional deployment. As is shown in FIG. 5A, a human thumb completes the circuit within the image generator and causes the luminescent layer to generate an irradiated image representing the human thumb as disclosed in Irradiated Images and related patents. The light or other type of radiation from the image generator passes through the substrate layer 12, through the front translucent electrode layer 14 and into the reactive layer 16. The addressable zones 38 of the reactive layer 16 exposed to the irradiated image will react to the radiation. Front translucent electrode strips 20 and rear electrode strips 24 will detect the change in the reactive layer 16 at the addressable zones 38. Polling the state of addressable zones 38 via electrode strips 20 and 24 will enable a corresponding signal to be generated that is representative of the irradiated image.

Figure 5B:
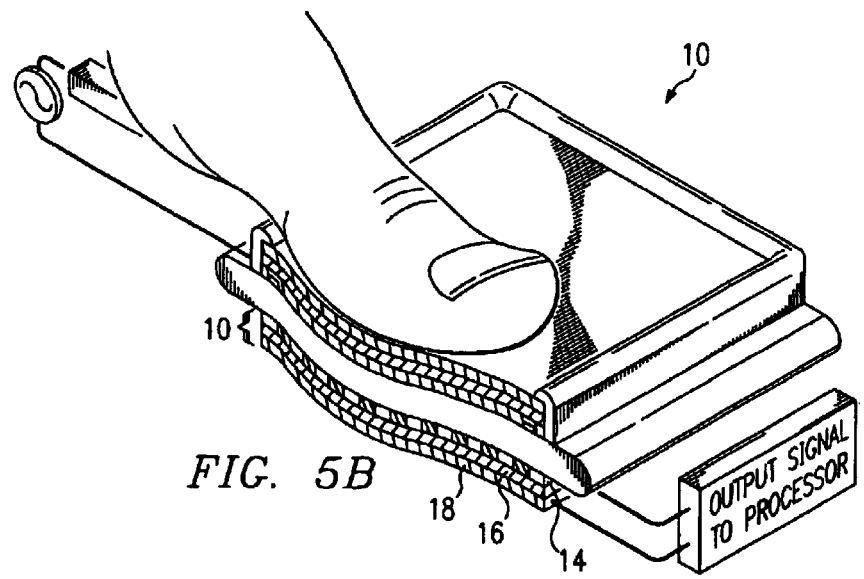
FIG. 5B is an orthographic view of a three-dimensional embodiment of the present invention in use.

FIG. 5B is an orthographic view of a combined image generator and receptor laminate 10 as in FIG. 5A, except in three-dimensional deployment. This embodiment offers all of the features of the embodiment depicted in FIG. 5A with the added advantage of being able to generate a signal representative of a three-dimensional image.

Techniques of sampling or polling arrays of interconnected electrodes are well known in the art and may be useful to create a digital signal representative of the irradiated image. Also, techniques are known in the art for converting the current state of a polled or sampled array into a representative digital signal suitable for processing by digital processors.

Although the present invention and its advantages have been described in detail, it should be understood that various changes, substitutions and alterations can be made herein without departing from the spirit and scope of the invention as defined by the appended claims.

We claim:

1. An addressable receptor, comprising:
    a rear conductive layer including a plurality of substantially parallel rear electrode strips, each of the rear electrode strips being individually substantially electrically isolated;
    a front conductive layer including a plurality of substantially parallel front electrode strips, each of the front electrode strips also being individually substantially electrically isolated, wherein a plurality of the front electrode strips comprise an electrically-conductive material that is at least partially transparent to radiation in a selected waveband;
    the front conductive layer superposed over the rear conductive layer and oriented with respect thereto so as to form an array of electrode regions of intersection corresponding to regions at which the rear electrode strips cross over the front electrode strips; and
    the rear and front conductive layers separated by a reactive layer, the reactive layer comprising a plurality of predetermined reactive regions, the reactive regions located in a reactive array substantially in register with the array of electrode regions of intersection so that the reactive regions are electrically addressable by coordinate pairs of rear and front electrode strips.

2. The addressable receptor of claim 1, in which selected ones of the rear conductive layer, the front conductive layer and the reactive layer are polymer thick film layers.

3. The addressable receptor of claim 1, in which the front conductive layer is oriented substantially perpendicularly with respect to the rear conductive layer.

4. The addressable receptor of claim 1, in which the selected waveband is visible light, and in which the electrically-conductive material that is at least partially transparent thereto is a material selected from the group consisting of:
    (a) indium-tin-oxide;
    (b) aluminum-tin-oxide;
    (c) zinc-coated glass fibre;
    (d) gold;
    (e) doped antimony; and
    (f) tantalum-tin-oxide.

5. The addressable receptor of claim 1, in which the selected waveband is the visible spectrum.

6. The addressable receptor of claim 1, in which the rear electrode strips are substantially electrically isolated via intervening strips of non-conductive filler.

7. The addressable receptor of claim 1, in which the front electrode strips are substantially electrically isolated via intervening strips of non-conductive filler.

8. The addressable receptor of claim 1, in which the reactive regions are discrete regions substantially electrically isolated via surrounding territories of non-conductive filler.

9. The addressable receptor of claim 8, in which the reactive regions are deposited using a process selected from the group consisting of:
    (a) ink jet printing;
    (b) screen printing;
    (c) electrostatic deposition;
    (d) rotary gravure;
    (e) rotary flexo;
    (f) micro pen; and
    (g) hollow fiber pen.

10. The addressable receptor of claim 1, in which the reactive regions comprise a reactive material selected from the group consisting of:
    (a) multi-crystal silicon;
    (b) cadmium-telluride;
    (c) cadmium-sulfide; and
    (d) silver-sulfide.

11. The addressable receptor of claim 1, in which the reactive layer comprises a unitary reactive layer commonly interposed between multiple electrode regions of intersection, the predetermined reactive regions therein substantially described by zones of the unitary reactive layer physically located between rear and front electrode strips at the electrode regions of intersection.

12. The addressable receptor of claim 11, in which the unitary reactive layer comprises a material having Z-axis properties.

13. The addressable receptor of claim 12, in which the unitary reactive layer is deposited in polymer thick film form using a vehicle that provides the Z-axis properties after curing.

14. The addressable receptor of claim 1, in which selected ones of the rear and front electrode strips are deposited using a process selected from the group consisting of:
    (a) screen printing;
    (b) micro pen deposition;
    (c) photo-mask etching;
    (d) electrostatic printing;
    (e) rotary gravure; and
    (f) hollow fibre deposition.

15. The addressable receptor of claim 1, in which the rear and front electrode strips are of substantially equal width in the range of 1–50 microns.

16. The addressable receptor of claim 1, in which the reactive regions are of substantially equal diameter in the range of 5–15 microns.

17. The addressable receptor of claim 1, in which the rear and front conductive layers in combination with the reactive layer comprise a membranous laminate.

18. The addressable receptor of claim 17, in which selected ones of the rear and front conductive layers and the reactive layer comprise a UV-curable carrier.

19. The addressable receptor of claim 1, in which the rear and front conductive layers in combination with the reactive layer comprise a laminate, the addressable receptor further including:
    a substrate upon which the laminate is disposed; and
    an envelope layer substantially sealing the laminate to the substrate, the envelope layer leaving connector portions of the rear and front electrode strips exposed so as to allow electrical connection thereto.

20. The addressable receptor of claim 1, in which the rear and front conductive layers in combination with the reactive layer comprise a laminate, the addressable receptor further including:

a substrate upon which the front conductive layer is disposed.

21. The addressable receptor of claim 1, in which the rear and front conductive layers in combination with the reactive layer comprise a receptor laminate, the receptor laminate included in a unitary laminate assembly also comprising an irradiated image generating laminate.

22. The addressable receptor of claim 21, in which the unitary laminate assembly acts as a self-contained apparatus for directly converting images described by contact into digital signals representative thereof.

23. The addressable receptor of claim 1, in which a plurality of the rear electrode strips comprise a material selected from the group consisting of:

(a) silver;
(b) graphite;
(c) copper;
(d) metal-coated glass; and
(e) a metal oxide.

24. The addressable receptor of claim 1, in which at least one of the rear and front conductive layers deploys electrode strips in a pattern containing curves.

25. The addressable receptor of claim 1, in which the rear and front conductive layers deploy electrode strips in a three-dimensional contoured shape.

* * * * *